US012623179B2

(12) United States Patent
Lux et al.

(10) Patent No.: US 12,623,179 B2
(45) Date of Patent: May 12, 2026

(54) ROTARY BED FOR DIRECT CAPTURE OF CO2 FROM AIR

(71) Applicant: EXXONMOBIL TECHNOLOGY AND ENGINEERING COMPANY, Annandale, NJ (US)

(72) Inventors: Shelby Lux, Maplewood, NJ (US); Jessica L. Ross, Humble, TX (US); Eric Simmers, Houston, TX (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 277 days.

(21) Appl. No.: 18/452,913

(22) Filed: Aug. 21, 2023

(65) Prior Publication Data

US 2024/0066460 A1 Feb. 29, 2024

Related U.S. Application Data

(60) Provisional application No. 63/373,268, filed on Aug. 23, 2022.

(51) Int. Cl.
B01D 53/02 (2006.01)
B01D 53/06 (2006.01)

(52) U.S. Cl.
CPC ........ B01D 53/06 (2013.01); B01D 2257/504 (2013.01); B01D 2258/06 (2013.01); (Continued)

(58) Field of Classification Search
CPC ........ B01D 2253/342; B01D 2257/504; B01D 2258/06; B01D 2259/40086; (Continued)

(56) References Cited

U.S. PATENT DOCUMENTS 4,775,484 A 10/1988 Schmidt et al.
6,193,504 B1 * 2/2001 Chen ...................... F23G 7/066
422/175
(Continued)

FOREIGN PATENT DOCUMENTS

CN 108355462 A 8/2018
EP 3725391 B1 10/2020
(Continued)

OTHER PUBLICATIONS

International Search Report and Written Opinion received for PCT Patent Application No. PCT/US2023/030680, mailed on Oct. 27, 2023, 136 pages.
(Continued)

*Primary Examiner* — Christopher P Jones
(74) *Attorney, Agent, or Firm* — Shook, Hardy & Bacon L.L.P.

(57) ABSTRACT

Systems and methods are provided for performing direct air capture using a rotary sorbent bed configuration. The rotary sorbent bed is supported on a wheel that serves as a framework structure for supporting the sorbent bed. The sorbent bed can include one or more monoliths that form the support material for the sorbent bed, and a sorbent supported on the one or more monoliths. The rotational path of the sorbent bed passes through the enclosure that allows for sealing of the portion of the sorbent bed within the enclosure. Optionally, the enclosure can contain a plurality of sub-zones that facilitate temperature control and/or pressure control within the enclosure while allowing for recovery of a high purity $CO_2$ stream from the desorption zone. The rotary sorbent bed configuration can allow for continuous or semi-continuous capture of $CO_2$ while reducing or minimizing contact of the sorbent bed with oxygen at elevated temperature.

14 Claims, 5 Drawing Sheets

(52) U.S. Cl.
    CPC .............. *B01D 2259/40086* (2013.01); *B01D 2259/4009* (2013.01)

(58) Field of Classification Search
    CPC ............ B01D 2259/4009; B01D 53/06; B01D 53/08; B01J 20/28042; Y02C 20/40
    See application file for complete search history.

(56) References Cited

U.S. PATENT DOCUMENTS

| | | | | |
|---|---|---|---|---|
| 6,235,249 | B1 * | 5/2001 | Fu ............................ | B01J 19/28 422/177 |
| 6,838,063 | B2 * | 1/2005 | Kondo .................... | C01B 3/323 165/DIG. 29 |
| 7,972,422 | B2 | 7/2011 | Ballard et al. | |
| 8,052,783 | B2 | 11/2011 | Baker | |
| 8,974,576 | B2 | 3/2015 | Gupta et al. | |
| 9,120,049 | B2 | 9/2015 | Sundaram et al. | |
| 9,227,153 | B2 | 1/2016 | Eisenberger | |
| 9,925,488 | B2 | 3/2018 | Eisenberger | |
| 11,014,040 | B2 | 5/2021 | Boulet et al. | |
| 11,850,569 | B2 * | 12/2023 | Elliott .................. | B01J 20/3236 |
| 2004/0197612 | A1 * | 10/2004 | Keefer .............. | H01M 8/04231 429/513 |
| 2005/0150378 | A1 * | 7/2005 | Dunne ................. | B01D 53/261 95/113 |
| 2011/0209613 | A1 | 9/2011 | Jensen et al. | |
| 2014/0134553 | A1 * | 5/2014 | Ghoniem ................ | F23C 99/00 431/170 |
| 2014/0175336 | A1 * | 6/2014 | Gupta ........................ | C07C 7/12 585/824 |
| 2015/0007726 | A1 * | 1/2015 | Elliott .................... | B01D 53/06 95/139 |
| 2017/0305744 | A1 * | 10/2017 | Gupta .................. | B01D 53/047 |
| 2018/0099244 | A1 * | 4/2018 | Okano ................... | B01D 53/06 |
| 2020/0001233 | A1 | 1/2020 | Okano | |
| 2023/0073553 | A1 * | 3/2023 | Holman ............... | B01D 53/261 |
| 2024/0157283 | A1 * | 5/2024 | Marshall ............ | B01D 53/0462 |

FOREIGN PATENT DOCUMENTS

| | | |
|---|---|---|
| JP | 2019-013906 A | 1/2019 |
| JP | 2019-188319 A | 10/2019 |
| WO | 2014/099238 A1 | 6/2014 |

OTHER PUBLICATIONS

Office Action received for Canadian Patent Application No. 3,264,434, mailed on Feb. 24, 2026, 5 pages.

Office Action received for Japanese Patent Application No. 2025-511503, mailed on Mar. 24, 2026, 11 pages (6 pages of English Translation and 5 pages of Original Document).

* cited by examiner

ROTARY BED FOR DIRECT CAPTURE OF CO2 FROM AIR

CROSS-REFERENCE TO RELATED APPLICATION

This Non-Provisional Patent application claims priority to U.S. Provisional Patent Application No. 63/373,268, filed Aug. 23, 2022, and titled "ROTARY BED FOR DIRECT CAPTURE OF CO2 FROM AIR" the entire contents of which is incorporated herein by reference.

FIELD

Systems and methods are provided for using a rotary bed contactor for direct capture of $CO_2$ from air.

BACKGROUND

Capture and sequestration of $CO_2$ can contribute to efforts for reducing or minimizing the amount of $CO_2$ introduced into the atmosphere by various commercial, residential, and/or industrial processes. One option is to attempt to capture $CO_2$ as it is generated at various types of point sources. Another option is to attempt to remove $CO_2$ directly from air.

Some of the difficulties with direct air capture are related to the relatively low concentration of $CO_2$ in the atmosphere. Typical $CO_2$ concentrations in air are on the order of 400 volume parts per million (vppm). Due to the relatively low concentration of $CO_2$ in comparison with other air components, achieving a high loading of $CO_2$ at fast adsorbent rates in an adsorbent can be difficult, leading to increased material costs. Additionally, the amount of energy used per $CO_2$ molecule captured can also be high, due in part to the relatively low density of $CO_2$ that can be adsorbed in a typical adsorbent based on the low concentration of $CO_2$ in the atmosphere. It would be beneficial to have improved systems and methods for capturing $CO_2$ from air that can reduce or minimize the associated capital costs and/or energy requirements.

In order to manage the plurality of flows that a sorbent is exposed to, there are two basic strategies. One strategy is to maintain the sorbent in a fixed volume corresponding to a sorbent environment, and then bring the various flow streams sequentially into the sorbent environment for contact with the sorbent. In this strategy, complex process flow management is needed so that the different flow streams do not mix while still reducing or minimizing the time required to switch between the various flow streams. An additional complication is that in order to have a continuous process, where air is continually taken in for $CO_2$ removal, multiple sorbent beds in parallel are required. Each parallel bed increases the complexity of the piping and manifolds required for managing the process flows.

The other option is to allow the sorbent to move, so that the piping for the process flows can be fixed. This has the advantage of simplifying the transport of the gas flows for the direct air capture process. However, conventional methods for allowing the sorbent to move to the gas flow have suffered from a variety of mechanical issues and/or difficulties with reliability. What is needed is an improved method for performing direct air capture that can simplify the handling of gas flows while still providing mechanical stability and reliability.

U.S. Pat. No. 9,925,488 describes a direct air capture system with a plurality of monoliths arranged on a closed loop track. As the monoliths move around the track, $CO_2$ is sorbed. One position on the track includes a box. If the box is at a different level than the track, the monolith is moved into the box, sealed in the box, and then exposed to conditions for desorption of $CO_2$. The continuous removal and re-insertion of monoliths into the track creates the potential for mechanical and/or reliability difficulties. If the box is at the level of the track, the monolith moves into the box while forming a seal with the box to provide a sealed environment for $CO_2$ desorption. Achieving the necessary seals to maintain the separate environment poses a variety of challenges. Additionally, scaling this type of design up to an appropriate size for commercial scale removal of $CO_2$ may present structural design challenges.

European Patent Publication 3725391 describes a direct air capture device that uses vertical adsorbent beds in a linear array, with start/stop movement of sliding doors surrounding the beds. The reliability of designs of this type are reduced by the start/stop movement of the process equipment along the linear array of beds, which typically requires complex hoses and mechanical swivel joints in the piping system to accommodate the movement of the process equipment. Requiring such movement of the process equipment is known to be less reliable than permanently installed, fixed piping and equipment. Reliable mechanical swivel joints are limited to small diameters, so this type of configuration is further limited by the fact that hoses with 1 end fixed and 1 end moving cannot make a 360° rotation without breaking. This explains why the equipment in this configuration moves in a linear fashion instead of in a closed loop, thereby increasing the cost of the process due to the unproductive time while the process equipment moves from the end of the adsorbent bed back to the beginning. It is noted that this type of design can have difficulties with seals similar to the design in U.S. Pat. No. 9,925,488.

U.S. Pat. No. 11,014,040 describes a horizontal adsorbent bed that rotates through zones defined by a stator. The configuration includes floating seals with metallic bellows or diaphragms to urge the seals, which are known to be susceptible to mechanical fatigue failures in thermal cyclic processes such as the adsorptive gas separation process described therein. The cost of designs of this type are increased by the use of fluid passages with port connections to the rotor assembly, which will necessarily have a higher pressure drop and reduced uniformity of flow distribution, both of which lead to higher operating cost.

U.S. Pat. No. 9,227,153 describes a variety of configurations for performing direct air capture. Some configurations correspond to using thin sheets of sorbent that are oscillated back and forth between positions outside of an enclosure and within an enclosure to allow for isolation of sorbent within the enclosure during $CO_2$ sorption. Other configurations involve use of sorbent pellets that are circulated to allow for cyclic sorption and desorption of $CO_2$.

U.S. Pat. No. 8,974,576 describes use of a rotary monolith having sorbent material for sorption of $CO_2$ from a mixture of gases. However, no enclosure is described that allows different portions of the monolith to be exposed to sorption and desorption conditions at the same time.

U.S. Pat. No. 8,052,783 describes a rotary adsorber for continuous bulk separation of volatile organic carbons from a fluid flow. The majority of the adsorber is exposed to the fluid flow for sorption of the volatile organic carbons. A small portion of the adsorber is within a desorption zone, where a desorption fluid is used to desorb the volatile organics. No structures or apparatus for managing fluid flows within the desorption zone is described. The desorption is further facilitated by using electrical current in the portion of the wheel that is in the regeneration zone. It is noted that the electrical current is used to reduce or minimize temperature changes for the adsorber as it passes through the desorption zone.

U.S. Pat. No. 9,120,049 describes a rotary valve assembly for performing swing adsorption processes in an enclosed environment. Sorbent materials are arranged in separately sealed chambers. The rotary valve includes both a rotor and a stator with openings. When an opening in the rotor is aligned with an opening in the stator, the valve is "opened" and gas can flow into the chamber corresponding to the aligned openings. It is noted that passing large volumes of fluids through the types of valves described in this reference can lead to substantial additional pressure drop.

U.S. Pat. No. 7,972,422 describes a system corresponding to an enclosed environment for continuous removal of a gas from a mixture of gases. A cartridge containing a sorbent material are used for sorption of $H_2S$ from a gas stream. The cartridge can be rotated to allow for sorption and desorption within the enclosed environment.

It is noted that U.S. Pat. Nos. 9,120,049 and 7,972,422 are examples of rotary sorbent configurations where the entire sorbent bed is within one or more pressure-controlled volumes during operation. This type of configuration is characterized by having a plurality of valves that control entry and exit of fluid flows into the volume(s) that contain the sorbent bed. It is noted that air could be used as an input gas flow in this type of configuration. However, in this type of configuration, such air passes through a plurality of valves and conduits, and therefore some type of compressor is used to maintain target combinations of flow rates and pressure. While this type of configuration is effective for maintaining control of pressure and flow rates during a sorption/desorption cycle, practical considerations limit the potential size or scale of this type of configuration. For example, as a practical matter, this type of configuration requires valves such as rotary valves or poppet valves to maintain control over the fluid flows within the vessel(s). Commercially available valves of these types are limited in size. Additionally, the pressure drops involved in delivering fluid flows through the valves and manifolds required by this type of configuration result in large pressure drops at the volumetric flow rates that are required for direct air capture. Thus, substantial compression is required even when the target pressure within the volume(s) containing the sorbent bed is near ambient.

SUMMARY

In an aspect, a system for sorption of $CO_2$ is provided. The system includes a sorbent bed housing. The system further includes a wheel framework structure within the sorbent bed housing. The system further includes a sorbent bed. The sorbent bed includes a support material corresponding to one or more monoliths, the one or more monoliths supported by the wheel framework structure. The support material further includes a first surface, a second surface, and a plurality of channels providing a flow path between the first surface of the support material and the second surface of the support material. The sorbent bed further includes a sorbent with selectivity for sorption of $CO_2$ supported on the support material, at least a portion of the sorbent being supported on one or more surfaces within the plurality of channels. The system further includes at least one fan or blower associated with the sorbent bed housing, the at least one fan or blower being in fluid communication with a first portion of the plurality of channels. The system further includes at least one cover plate. The system further includes one or more cover plate seals attached to the one or more cover plates, a second portion of the plurality of channels being within a desorption zone volume defined by the at least one cover plate and the one or more cover plate seals. Depending on the aspect, the one or more cover plate seals provide a) a seal between the at least one cover plate and the first surface of the support material, b) a seal between the at least one cover plate and the second surface of the support material, or c) a combination of a) and b). The system further includes one or more input flow conduits providing fluid communication between at least a source of a one or more gases and the desorption zone volume. Additionally the system includes at least one output flow conduit in fluid communication with the desorption zone volume.

In another aspect, a method of sorbing $CO_2$ is provided. The method includes rotating a wheel framework structure that supports a sorbent bed, the sorbent bed including a support material comprising one or more monoliths and a sorbent having selectivity for sorption of CO 2 supported on the support material. The support material further includes a first surface, a second surface, and a plurality of channels providing a flow path between a first surface of the support material and a second surface of the support material, at least a portion of the sorbent being supported on one or more surfaces within the plurality of channels. The method further includes exposing a first gas flow comprising 15 vol % to 25 vol % $O_2$ and 100 vppm to 650 vppm $CO_2$ to a first portion of the sorbent bed outside of the desorption zone volume, the first gas flow having a temperature of 0° C. to 40° C. Additionally, the method includes exposing a plurality of gas flows to a second portion of the sorbent bed within the desorption zone volume, the desorption zone volume defined by at least one cover plate and one or more cover plate seals, the one or more cover plates seals providing a) a seal between the at least one cover plate and the first surface of the support material, b) a seal between the at least one cover plate and the second surface of the support material, or c) a combination thereof. In some aspects, the exposing the plurality of gas flows to the second portion of the sorbent bed includes sequentially exposing the second portion of the sorbent bed to: a purge gas flow to form a purge exhaust, and a steam flow having a temperature of 80° C. to 180° C. to form a $CO_2$-containing output flow. In various aspects, the rotating of the wheel framework structure changes the portions of the sorbent bed that correspond to the first portion of the sorbent bed outside of the desorption zone volume and the second portion of the sorbent bed within the desorption zone volume.

DETAILED DESCRIPTION

Figure 1:
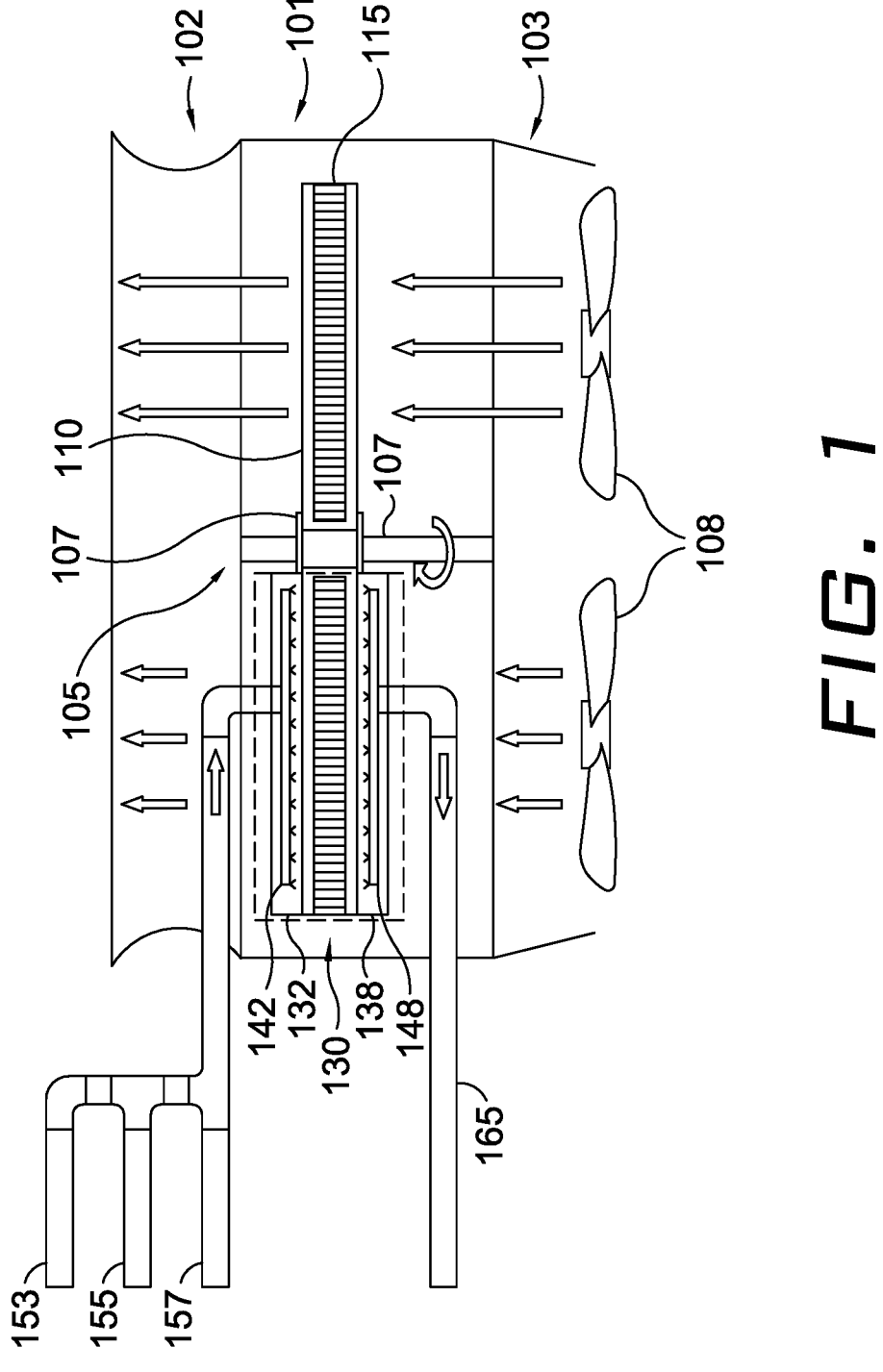
FIG. 1 shows a side of an exemplary configuration for sorption of $CO_2$ from a gas flow using a sorbent bed supported on a rotary wheel framework structure.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing direct air capture using a rotary sorbent bed configuration. The rotary sorbent bed is supported on a wheel that serves as a framework structure for supporting the sorbent bed. The sorbent bed can include one or more monoliths that form the support material for the sorbent bed, and a sorbent supported on the one or more monoliths. The sorbent bed can be oriented in any convenient manner, such as in a horizontal configuration or a vertical configuration. The rotational path of the sorbent bed passes through the enclosure that allows for sealing of the portion of the sorbent bed within the enclosure. Optionally, the enclosure can contain a plurality of sub-zones that facilitate temperature control and/or pressure control within the enclosure while allowing for recovery of a high purity $CO_2$ stream from the desorption zone. The rotary sorbent bed configuration can allow for continuous or semi-continuous capture of $CO_2$ while reducing or minimizing contact of the sorbent bed with oxygen at elevated temperature.

Conventionally, direct air capture using a rotary sorbent bed configuration has presented challenges due to competing considerations. With regard to the sorption part of a sorption/desorption process, due to the low concentration of $CO_2$ in air, large volumes of air need to be exposed to a sorbent bed in order to achieve substantial $CO_2$ capture. However, because of the large volumes of air that need to be processed, it is desirable to reduce or minimize the energy associated with processing such air on a per volume basis. In order to achieve this, it is desirable to reduce or minimize pressure drops associated with exposing air to a rotary sorbent bed, so as to reduce or minimize the amount of air movement power that is needed to maintain air flow for contact with the sorbent bed.

While the sorption process benefits from reduced or minimized constriction of air flow, the desorption portion of the sorption/desorption process cycle has different considerations. First, the desorption process needs to be performed in a sufficiently controlled manner to allow for desorption of $CO_2$ while reducing or minimizing loss of $CO_2$ back to the ambient environment. Second, for at least some types of sorbents (such as some amine-based sorbents), the sorbent material can be sensitive to oxygen exposure at elevated temperatures. This generally does not pose any issues during the sorption step, but higher temperatures are often used for desorption. For such sorbents that have sensitivity to combinations of oxygen at elevated temperatures, the desorption step needs to be sufficiently isolated from the sorption step so that degradation of the sorbent material during desorption is reduced or minimized.

In various aspects, systems and methods are provided that allow for control over the desorption zone environment while reducing or minimizing energy costs for performing direct air capture. This is achieved by using a desorption zone enclosure that is sealed relative to the sorption zone to allow for control over the desorption zone environment. As part of sealing the desorption zone relative to the sorption zone, a positive pressure can be maintained at the seal(s) between the desorption zone and sorption zone, so that any gas flow that occurs across the seal corresponds to outflow of gas from the desorption zone to the sorption zone. Optionally, the desorption zone can correspond to a plurality of sub-zones. In addition to allowing further control over the desorption zone environment, using multiple purged seals within the desorption zone can allow for a configuration where a desorption sub-zone is two or more purged seals away from the sorption zone. By using a desorption zone enclosure, a simplified configuration can be used to expose air to the sorbent bed, so that a reduced or minimized amount of air movement power is needed. Due to the reduced or minimized amount of air movement power that is needed, in some aspects the air flow can be controlled using one or more fans, as opposed to using a higher energy input blower or compressor.

Because the rotary sorbent bed is a continuous structure, concerns about how to maintain an isolated environment within the enclosure during movement of the sorbent bed are reduced or minimized. In particular, because the support material of the sorbent bed is always present, the support material (i.e., the one or more monoliths) is always in proximity to the seals of the cover plates. This reduces or minimizes the risk of air entering the enclosure, as the sealing conditions can be continuously maintained. Additionally, a positive pressure can be continuously maintained within the sealed region relative to the outside, so that air does not enter the enclosure. As a result, the only air transported into the desorption zone volume is any air that is optionally carried into the desorption zone within the sorbent bed itself. By controlling the entry of air into the desorption zone volume, the flows within the desorption zone can be simplified. A first flow can correspond to a purge gas for removing any air remaining within the rotary wheel as the wheel enters the desorption zone. A second flow of gas (such as steam) can then be used to increase the temperature and for desorbing $CO_2$. Then, a cooling gas (such as $N_2$) can be used to return the sorbent to a lower temperature prior to the wheel rotating that portion of the sorbent out of the desorption zone. Because substantially the only air in the desorption zone volume corresponds to air within the volume of the sorbent bed as the sorbent bed enters the zone, the gas flows in the desorption zone can be maintained continuously. It is noted that additional seals may be present within the desorption zone volume to define different regions, or sub-zones, within the desorption zone, so that mixing of the various flows within the desorption zone is reduced, minimized, or eliminated.

Additionally, the rotary sorbent bed can rotate in a single direction. This avoids the need for the additional complexity of having reciprocating motion and/or some other type of counter-directional movement to move a sorbent into and out of an enclosure.

It is noted that the above method of temperature and oxygen management is in contrast to conventional designs where separate sorbent monolith pieces are moved into and out of an enclosure. In such contrasting designs, air can enter the enclosure during as a monolith piece is moved into and out of the enclosure. Thus, separate purge steps are needed to remove air from the enclosure. Additionally, having doors/openings that open and close increases the mechanical complexity of the system, resulting in reduced reliability.

In some aspects, the enclosure can correspond to cover plates above and below the sorbent bed structure. The cover plates can also be referred to as regeneration plates. The cover/regeneration plates provide part of the definition for the desorption zone. The desorption zone corresponds to a volume defined by the volume within the cover/regeneration plates and the seals between the cover/regeneration plates and the rotary sorbent bed. Typically the seals on the two sides of the sorbent bed will be aligned, so that the desorption zone volume is defined based on drawing connecting lines between the seal(s) on one side of the sorbent bed to the seal(s) on the other side of the sorbent bed. If the seals are not aligned, then the desorption zone volume can be identified by starting from the seal on the side of the sorbent bed that receives air flow, and then drawing lines from the seal that are parallel to the axis of rotation of the sorbent bed until the other side of the sorbent bed is reached. This provides a definition for the portion of the sorbent bed that is within the desorption zone volume. The portion of the sorbent bed outside of the desorption zone volume is within the sorption zone. It is noted that temperature adjustment can also be performed in the desorption zone.

In some aspects, the sorbent bed can rotate continuously. In such aspects, gas flow for both the sorption zone and the desorption zone can be continuous. In such aspects, the seals for the cover plates can correspond to "purged" seals, where a portion of the sealing function is provided by the higher pressure within the sealed region (i.e., within the desorption zone). Thus, the seals can correspond to non-contact seals, such as wiper seals, that are close to the surface of the monolith but not in contact with the surface. By using a non-contact seal, difficulties with mechanical urging of a seal are avoided. Mechanical urging of a seal results in breakdown of the seal over time, reducing reliability. In this type of aspect, a plurality of gas flows can be used in the desorption zone, so that the sorbent bed is sequentially exposed to the plurality of gas flows as the sorbent bed rotates through the desorption zone.

In other aspects a contact seal (such as a roller seal) can potentially be used with a continuously rotating sorbent bed. While this may reduce reliability of the seal, this can reduce or minimize the need for using a purge gas at the seal interface. Roller seals and contact wiper seals are examples of seals that could be used in this type of configuration.

In still other aspects, the sorbent bed can rotate in fixed increments so that the sorbent bed starts and stops movement periodically to re-position the portion of the wheel that is within the desorption zone (i.e., the sealed region defined by the cover plates). In this type of aspect, because the sorbent bed is not moving for a portion of the time, an inflatable seal or another type of contact seal (such as a roller seal) can potentially be used. Wiper seals can also be used in this type of aspect. This can be combined with maintaining a higher pressure within the desorption zone to avoid introduction of air into the desorption zone. In this type of aspect, the plurality of gas flows used in the desorption zone can be exposed to the sorbent bed sequentially in time, as opposed to the spatially sequential exposure used during continuous movement of the sorbent bed.

During operation, the portion of the sorbent bed in the sorption zone can be exposed to a flow of air (or another gas flow with a low concentration of $CO_2$) to allow for sorption of $CO_2$ by the sorbent that is supported on the monolith. The portion of the sorbent bed in the desorption zone can be exposed to a) an initial purge gas, to remove air contained within the sorbent bed as the bed rotates into the desorption zone; b) steam, to increase the temperature of the sorbent bed within the desorption zone and desorb $CO_2$; and c) a temperature adjustment gas, such as nitrogen, for cooling of the monolith prior to exiting from the desorption zone. In some aspects, the plurality of gas flows can be substantially parallel flows to reduce or minimize mixing. In other aspects, one or more additional seals can be present within the desorption zone to define separate regions (or sub-zones) for the sorbent bed within the desorption zone. For example, additional seals can be used to maintain separate sub-zones that are exposed to the steam and the temperature adjustment gas. In this discussion, spatial regions within the desorption zone that are exposed to different gas flows are defined as sub-zones. Preferably, such sub-zones can be separated by an internal seal within the desorption zone, so that mixing of gases is reduced, minimized, or eliminated for such volumes. Seals can be used to form sub-zones either above or below the sorbent bed. It is noted that for sorbent beds constructed of a porous material, some mixing of gases between sub-zones can potentially occur within the sorbent bed.

Generally, the sorption zone and desorption zone can have any convenient size, although the sorption zone will typically correspond to a larger portion of the sorbent bed than the desorption zone. In various aspects, the volume defined inside the enclosure defined by the cover plates and seals (i.e., the desorption zone) can contain 50 vol % or less of the volume of the sorbent bed, or 40 vol % or less, or 30 vol % or less, or 20 vol % or less, such as down to 5.0 vol % of the volume of the rotary wheel or possibly still less.

In various aspects, the systems and methods described herein can have one or more of the following features: 1) In some aspects, the purged seal between the sorption zone and the desorption zone can result in a gas flow across the seal from the desorption zone into the sorption zone. 2) In some aspects, the enclosure for the desorption zone can be located within the sorption zone volume. This means that the gas flow in the sorption zone (e.g., air) can impinge on at least one surface of the desorption zone, where the average direction of flow for the gas flow in the sorption zone is substantially orthogonal to the surface. This is in contrast to a configuration, for example, where the enclosure corresponds to the full height of the separation between the fan or blower and the sorbent bed, so that air from the fan or blower does not impinge on a top surface of the enclosure. 3) In some aspects, the sorption zone can be in direct fluid communication with a fan or blower, without an intervening valve between the fan or blower and the sorption zone. Alternatively, the fan or blower can be in direct fluid communication with the rotary sorbent bed, without an intervening valve between the fan or blower and the rotary sorbent bed. 4) In some aspects where the desorption zone includes a plurality of sub-zones, a desorption sub-zone can be separated from the sorption zone by at least two purged seals, such as at least one internal seal and a cover plate seal.

Sorbent Bed Structure and Wheel Framework Structure

In various aspects, a $CO_2$ sorption/desorption process can be carried out using a sorbent bed that corresponds to a sorbent supported on a sorbent support material (such as one or more monoliths). The sorbent bed is supported by a wheel framework structure that serves as a rotor. The sorbent can be supported on the support material in any convenient manner, such as having the sorbent supported on interior surfaces of channels that pass through the sorbent support material. The resulting sorbent bed can provide a high surface area for contact of $CO_2$-containing gas while still allowing air to pass through the sorbent bed with a reduced or minimized pressure drop.

One option for providing this type of structure is to use a sorbent bed that includes a large plurality of channels that pass through the sorbent bed roughly parallel to the axis of rotation of the sorbent bed. The channels can have any convenient shape that allows for support of a sorbent material on the interior surfaces of the channels. Based on packing density considerations, a square, rectangular, or hexagonal shape may be beneficial for the plurality of channels, but channels having a round shape or another convenient shape can also be used.

The framework structure for supporting the sorbent bed can correspond to a wheel. The wheel framework structure can be constructed from any convenient material that provides sufficient structural integrity. Stainless steel (or other types of steel) is an example of a suitable material for forming the framework structure. The support material of the sorbent bed (e.g., one or more monoliths) can rest on/within the wheel framework structure. In some aspects, the sorbent bed can be attached to the wheel. In other aspects, wedges, pins, and or other structures can be used to hold the sorbent bed in place in the wheel framework structure via friction. In some aspects, the wheel framework structure can also serve as a rotor, with the wheel being directly attached and/or being part of the same piece as a shaft used to rotate the sorbent bed. In other aspects, the wheel framework structure can be mechanically linked to the rotor via one or more gears. It is noted that if gears are used to rotate the sorbent bed, the mechanical linkage of the gears to the wheel framework structure can be near the center of the wheel, or gears around the exterior edges of the wheel framework structure can be used.

The one or more monoliths corresponding to the sorbent support material can be composed of a material that provides sufficient structural stability for the support material during rotation of the sorbent bed. The size of the sorbent bed can vary, but at commercial scale, the diameter of the sorbent bed can range from 1.0 meter to 25 meters, with a thickness (i.e., depth) ranging from 0.2 meters to 2.0 meters. Suitable materials for forming a monolith (or for forming pieces that can be assembled to form a roughly disc shape of support material) can include refractory metal oxides, metals, and ceramics. If the sorbent bed has sufficient thickness, some polymer systems may also provide sufficient structural stability to form a sorbent bed. Examples of support materials include, but are not limited to, silica, alumina, titania, steel (including stainless steel), and silicon carbide.

Preferably, the support material can be a monolith with a sorbent supported on at least a portion of the surfaces within the interior of channels that pass through the support material. More generally, the one or more monoliths used as the support material can form any type of continuous structure that has sufficient structural stability to rotate through the desorption zone. Thus, support materials that are an assembly of smaller monoliths (such as pie-shaped portions) could also be used to form a support material for a sorbent bed. The support material (e.g., monolith, assembly of smaller pieces) can preferably have a high density of flow channels or cells, such as 20-2000 channels per square inch, or 100-2000 channels per square inch, or 20-1000 channels per square inch, or 100-1000 channels per square inch. Examples of some types of monoliths are commercially available, such as the CELCOR® monoliths available from Corning. A sorbent, such as an amine-based sorbent, can be supported on the interior surfaces of these channels. This type of structure can provide a high surface area of sorbent while reducing or minimizing the pressure drop as gases pass through the sorbent bed.

After forming a monolith, or after forming a plurality of pieces that can be assembled to form the support material, a sorbent can be added to the surface(s) of the support material(s). For example, a washcoat of an amine-based sorbent can be applied to the surfaces of the channels in the monolith (or channels in the plurality of monolith pieces). This can provide a relatively uniform distribution of sorbent on the interior surfaces of the channels. It is noted that sorbent does not need to be incorporated on the full length of the channels. The thickness of the sorbent support material may be selected based in part on structural stability considerations, while the depth of the sorbent in the channels (i.e., the sorbent bed) can be any convenient value that is equal to or less than the thickness of the channels in sorbent support material.

In this discussion, reference may be made to the leading edge of the sorbent bed and the trailing edge of the sorbent bed. The leading edge of the sorbent bed generally refers to the edge of the sorbent bed that is first exposed to air (or another $CO_2$-containing flow) when the sorbent bed is in the sorption zone. The trailing edge of the sorbent bed corresponds to the opposite end of the sorbent bed.

Configuration Example

FIG. 1 shows a cross-sectional view of an example of a configuration for performing direct air capture using a rotary sorbent bed. The example shown in FIG. 1 corresponds to a configuration for a horizontal rotary sorbent bed. In FIG. 1, a rotor assembly 110 (including the wheel framework structure) is contained within a rotor housing 101. The rotor assembly 110 provides support for one or more monoliths that correspond to sorbent support material 115. A $CO_2$ sorbent material (such as an amine-based sorbent) is supported on one or more surfaces of support material 115, such as on the interior surfaces of channels that pass through support material 115 in a direction that is roughly orthogonal to the axis of rotation for the sorbent bed. The CO 2 sorbent material can be supported in any convenient manner on the support material 115. For example, the sorbent material can be applied as a washcoat. In the example shown in FIG. 1, the wheel framework structure/rotor assembly 110 is mounted on a central rotor support 105, such as by using bearing assemblies 107.

In the example configuration shown in FIG. 1, rotor support 105 rotates the rotor assembly 110 so that the portion of sorbent bed contained within the desorption zone 130 changes over time. In other aspects, movement of the sorbent bed can be performed by using gears to mechanically link the sorbent bed to a rotor. For example, in another aspect, the central support can serve primarily as a support, but not provide force for rotating the sorbent bed. Instead, gears along the exterior edge of framework structure can engage with the framework structure to provide rotation of the sorbent bed. More generally, any convenient method for rotating the sorbent bed may be used.

In the example shown in FIG. 1, the rotor housing 101 includes an upper fan shroud 102 and a lower fan shroud 103. The upper fan shroud 102 and lower fan shroud 103 assist with providing a higher degree of laminar air flow within rotor housing during operation. In other configurations, one or both of upper fan shroud 102 and lower fan shroud 103 can be optional. In FIG. 1, fan(s) 108 are shown below the rotor assembly 110, for driving air through the sorbent bed (such as through channels in support material 115). Depending on the configuration, fan(s) 108 could alternatively be located above the sorbent bed to pull air through the bed, or at least one fan could be located both above and below the sorbent bed. Still another option can be to use duct work to direct air from the fan(s) to the sorbent bed. After passing through sorbent bed, the air (partially depleted in $CO_2$) exits from upper fan shroud 102. Depending on the configuration, any convenient number of fans, blowers, and/or other systems for generating air movement can be used to facilitate air flow through the sorbent bed (such as through the channels of support material 115).

It is noted that in the example shown in FIG. 1, the diameter of the rotor assembly 110 (and/or the diameter of the sorbent bed) appears to be smaller than the diameter/length of the rotor housing 101. This is largely for convenience in illustrating the different components shown in FIG. 1. In various aspects, bypassing of air around the sorbent bed can be reduced or minimized, either by matching the size of the sorbent bed to the rotor housing and/or by adding additional structural/design features to minimize air flow that bypasses the bed. However, it is also noted that in aspects where air is the gas flow for the sorption zone, there is less concern for small amounts of $CO_2$ bypass as compared with applications where a flue gas or other high-concentration $CO_2$ flow is used as the gas flow for the sorption zone.

In the example shown in FIG. 1, desorption zone 130 is a volume defined by upper regeneration cover 132, lower regeneration cover 138, and the seals (not shown) support material 115 and the upper regeneration cover 132 and lower regeneration cover 138. In order to minimize or prevent movement of gas from outside of the desorption zone into the desorption zone (other than air carried into the desorption zone within the sorbent bed 115), in some aspects the seals for upper regeneration cover 132 and lower regeneration cover 138 can be aligned.

In the example shown in FIG. 1, the flows within the desorption zone 130 are counter-current relative to the flows outside of the desorption zone. In other words, outside of the desorption zone 130, air moves through the sorbent bed 115 from bottom to top. Within the desorption zone 130, the various flows move through the sorbent bed 115 from top to bottom. In other aspects, co-current flows inside and outside of the desorption zone can be used. In still other configurations, counter-current flows could be used, with the sorption zone flows moving from top to bottom and the desorption zone flows moving from bottom to top. It is further noted that the sorbent bed can be mounted in any other convenient manner. For example, the sorbent bed can be mounted vertically, so that the axis of rotation is orthogonal to the direction of gravitational pull.

In the example shown in FIG. 1, desorption zone 130 includes at least one gas distribution manifold 142 and at least one collection manifold 148. The gas distribution manifold(s) 142 provide the various gases used within the desorption zone. These can include one or more of the following, depending on the aspect: a) an initial seal purge gas 153 to maintain a positive pressure within the desorption zone relative to the volume outside of the desorption zone; b) steam 155 for heating the sorbent bed 115 to facilitate desorption of $CO_2$; c) temperature adjustment gas 157 (such as $N_2$) to cool the sorbent bed 115 after desorption of $CO_2$; and d) a final seal purge gas to maintain positive pressure within the desorption zone relative to the volume outside the desorption zone. Generally, the flows in the desorption zone will include at least the steam and the temperature adjustment gas. In various aspects where air is potentially carried into the desorption zone within the wheel, the initial purge gas can also be present both for maintaining a positive pressure within the desorption zone relative to the volume outside the desorption zone, and for purging any air (oxygen-containing gas) within the wheel prior to exposing the supported sorbent to the steam.

Collection manifold(s) 148 can collect the fluid flows that pass through the channels in support material 115. A first collection manifold and/or first portion of a collection manifold can collect air that is exhausted from the sorbent bed during the purge gas flow 153. A second collection manifold and/or second portion of a collection manifold can collect steam, liquid water, and $CO_2$ during steam flow 155. It is noted that part of the transfer of heat from the steam to the sorbent bed during desorption is based on condensation of steam. Thus, some liquid water will typically be present in the products of the desorption zone, even if liquid water is not introduced. Optionally, separate manifolds/collection troughs can be provided for separate collection of liquid products (water) and gas phase products (water vapor and $CO_2$) that exit from the sorbent bed during exposure to steam flow 155. In some preferred aspects, liquid water is not introduced into the desorption zone as part of the steam flow, in order to limit the potential for water to form a continuous liquid phase across the width of a channel that might restrict air flow through the channels in the support material 115. The collected liquid water, steam, and $CO_2$ output 165 generated during steam flow 155 can be further processed in any convenient manner. For example, a separation can be performed to recover the $CO_2$ as a higher purity stream. The $CO_2$ can then be sequestered and/or used as an input for another process. A third collection manifold and/or third portion of a collection manifold can collect the output flow generated during exposure of the temperature adjustment gas 157 to the sorbent bed for cooling of the bed. The output flow can typically have a higher water vapor content than the initial water vapor content of the temperature adjustment gas, due to evaporation of water from the bed during the cooling step. The evaporation of the water further assists with cooling of the bed.

In the example configuration shown in FIG. 1, various elements can be in fluid communication. For example, in FIG. 1, input flows 153, 155, and 157 are in fluid communication with desorption zone 130 via upper manifold 142. Upper manifold 142 is in direct fluid communication with desorption zone 130. Input flows 153, 155, and 157 are in indirect fluid communication with desorption zone 130. As another example, the channels in support material 115 (and therefore the sorbent bed) can be in direct fluid communication with the fan(s) 108. Other examples of direct and indirect fluid communication are described herein and illustrated in the figures.

Figure 2:
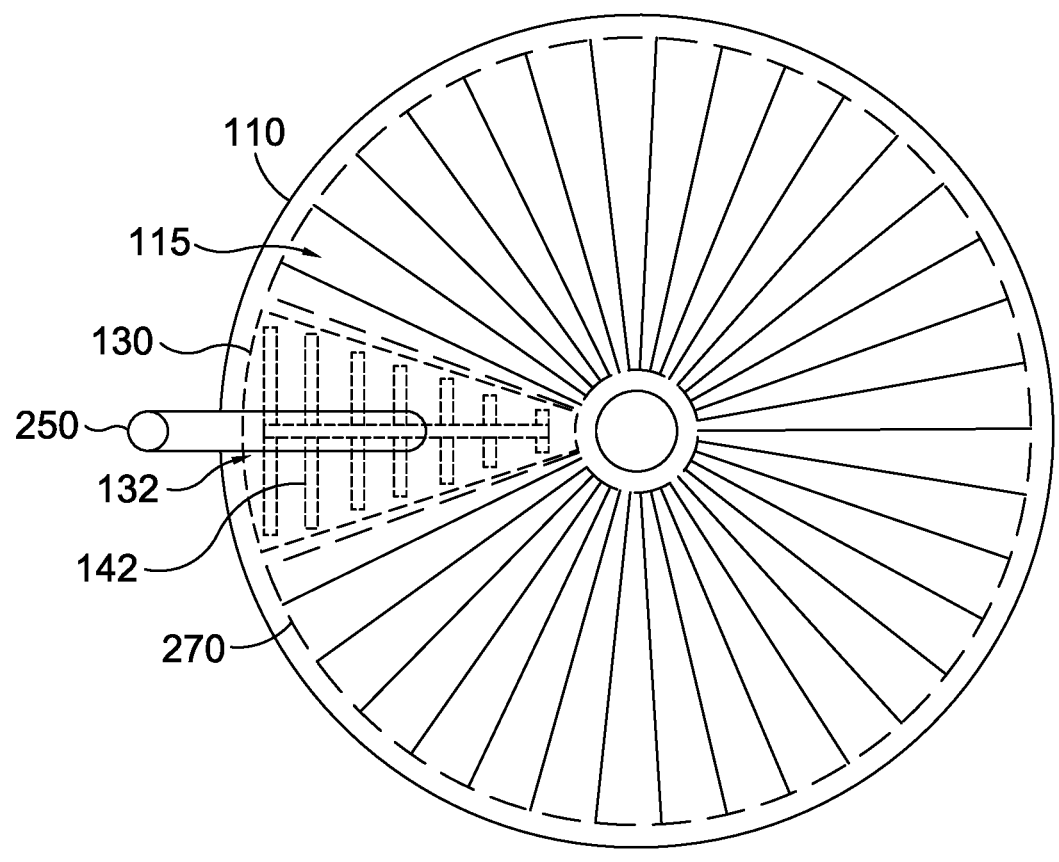
FIG. 2 shows a top view of a portion of the configuration shown in FIG. 1.

FIG. 2 shows a plan (top-down) view of the configuration shown in FIG. 1. As shown in FIG. 2, a majority of the sorbent bed (and therefore a majority of support material 115) is in sorption zone 270, with a smaller portion of the sorbent bed being within desorption zone 130. As the sorbent bed rotates, the portion of support material 115 within the desorption zone 130 changes over time. In the view shown in FIG. 2, the upper regeneration cover 132 and upper manifold(s) 142 are shown. Due to the top-down view, the lower regeneration cover and lower manifold(s) are not shown in FIG. 2. FIG. 2 also shows an input flow pipe 250. One or more input flow pipes 250 can be used to provide the various input flows to upper manifold(s) 142. Similar pipe(s) (not shown) can be used to carry away products or effluents collected by the lower manifold(s).

Figure 3:
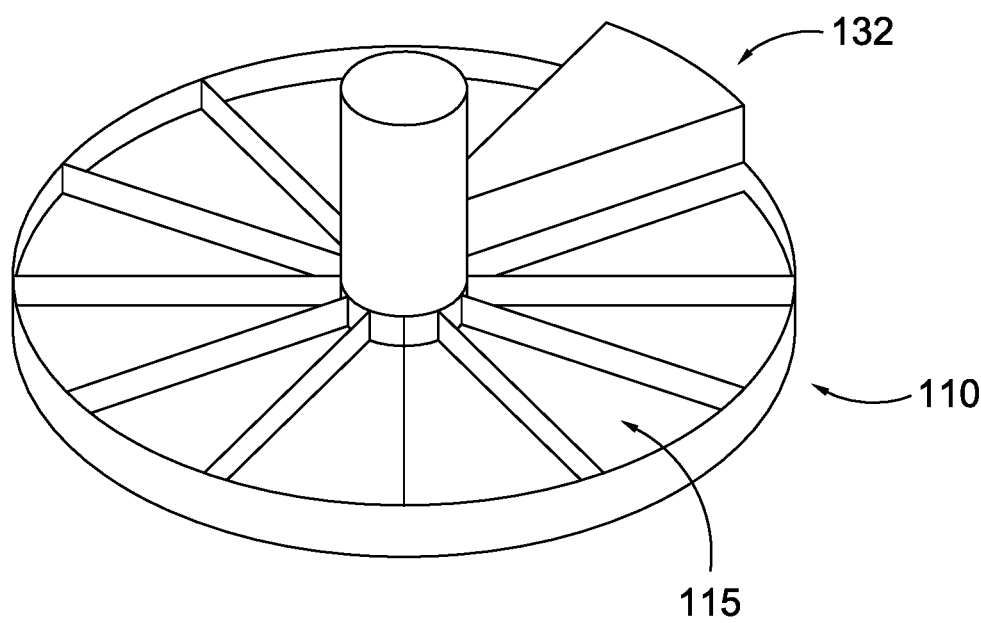
FIG. 3 shows a perspective view of a rotor assembly and desorption zone cover plate.

FIG. 3 shows a perspective view of the rotor assembly 110, the support material 115, and the upper regeneration cover 132. The upper regeneration cover 132 defines the upper volume of the desorption zone 130 from FIG. 1.

Figure 4:
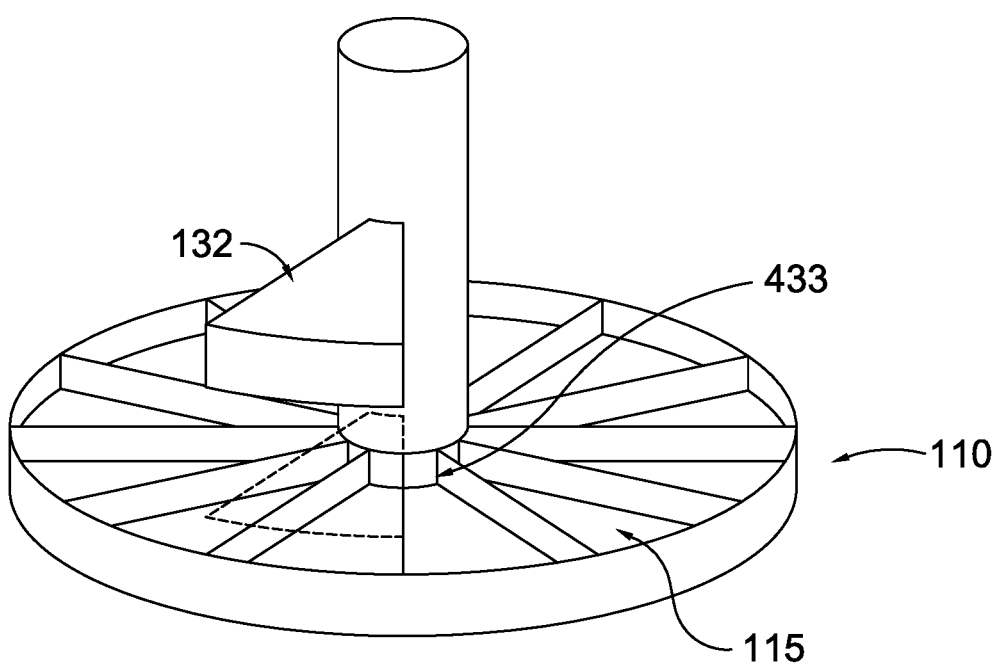
FIG. 4 shows an exploded view of the configuration shown in FIG. 3.

FIG. 4 shows an exploded view of the configuration shown in FIG. 3. The exploded view in FIG. 4 is provided to illustrate the location of the seal 432 between upper regeneration cover 132 and rotor assembly 110/support material 115. Similarly, a seal (not shown) can be provided between the lower regeneration cover and the rotor assembly/support material.

Operation of Sorption Zone

The processes during operation of the rotary sorbent bed can generally be divided into the process in the sorption zone and the processes in the desorption zone.

In the sorption zone, the sorbent bed is exposed to a $CO_2$-containing gas flow. In various aspects, the $CO_2$-containing gas flow is air. More generally, the $CO_2$-containing gas flow can be a gas flow with a $CO_2$ content of 650 vppm or less, or 500 vppm or less, or 400 vppm or less, such as down to 50 vppm or possibly still lower.

Air also contains $O_2$. Air typically contains roughly 20 vol % of $O_2$. However, the $CO_2$-containing gas flow can contain other quantities of $O_2$. In some aspects, the $CO_2$-containing gas flow can contain 10 vol % to 25 vol % of $O_2$, or 15 vol % to 25 vol %. For this type of $CO_2$-containing stream, the rotary wheel sorption apparatus described herein can provide benefits for reducing or minimizing unexpected entry of $O_2$ into the desorption zone, thereby reducing or minimizing the potential for degradation of the sorbent material during the desorption process. In other aspects, the $CO_2$-containing stream can have any convenient $O_2$ content. In an optional aspect, the $CO_2$-containing stream can have an $O_2$ content of 1.0 vol % or less, or 0.1 vol % or less.

In various aspects, the length of the sorption process is determined in part by the rotation rate of the sorbent bed. In other words, for a give portion of the sorbent bed, the sorption process starts when the portion of the sorbent bed exits from the desorption zone, and continues until the sorbent bed re-enters the desorption zone. Thus, the length of the sorption process can be selected based on the rotational speed of the rotary wheel.

In some aspects, the sorption process can be performed for a sufficient time to approach an equilibrium loading based on the temperature of the sorbent and the $CO_2$ concentration in air. In other aspects, the initial sorption can be stopped farther from equilibrium loading. For example, one of the difficulties with fully loading a sorbent with $CO_2$ during a direct air capture process is that the rate of sorption decreases as the loading approaches the equilibrium loading. One option can be to end the initial sorption step when the rate of sorption falls below a target amount. This target amount can be an absolute sorption rate, a sorption rate corresponding to a percentage of the sorption rate at the beginning of the initial sorption, a sorption rate corresponding to a percentage of the sorption rate for a fully desorbed sorbent, or another convenient target rate. Still another option can be to perform the initial sorption step for a period of time. For example, selecting a fixed time can serve as a proxy for selecting a target rate of sorption without requiring in-situ detection of the sorption rate.

During the sorption process, the sorbent bed can be at a temperature between 0° C. to 70° C., or 0° C. to 40° C., or 0° C. to 30° C., or 10° C. to 60° C., or 10° C. to 40° C., or 10° C. to 30° C. It is noted that when the sorbent bed first exits from the desorption zone, the sorbent bed may still be at a temperature between 40° C. to 70° C., due to only partial cooling of the sorbent bed prior to exiting from the desorption zone. Because the rate of sorption of $CO_2$ from air is relatively slow, heating of the sorbent bed due to the $CO_2$ sorption is also relatively low in comparison with the ability for the air to transport heat away from the sorbent bed. Thus, in some aspects, the temperature of the sorbent bed will tend to equilibrate with the temperature of the air or other $CO_2$-containing flow during the sorption process. In other aspects, a sufficiently low air flow rate and/or sufficiently high sorbent bed rotational speed may be used so that the sorbent bed does not equilibrate with the air temperature during the sorption process.

The average or superficial gas velocity of the $CO_2$-containing flow along the direction of the flow channels in the sorbent bed as the $CO_2$-containing flow passes through the sorbent bed can be between 0.02 m/s to 0.5 m/s, or 0.02 m/s to 0.2 m/s, or 0.05 m/s to 0.5 m/s, or 0.05 m/s to 0.2 m/s. In some aspects, the temperature of the $CO_2$-containing flow can be between 0° C. and 40° C., or 0° C. to 30° C., or 10° C. to 40° C., or 10° C. to 30° C. Such temperatures roughly correspond to the temperature of ambient air. In other aspects, a heated or chilled air flow could be used, so long as condensation of water on the bed is reduced, minimized, or avoided during the sorption process. The sorption process can typically be performed at a pressure near ambient conditions (roughly 100 kPa-a). Thus, a typical pressure range for the sorption zone can be 90 kPa-a to 120 kPa-a, or 90 kPa-a to 110 kPa-a. However, operating at near ambient pressure is largely due to cost and/or convenience. Pressures between 50 kPa-a to 10 MPa-a or even higher can be used if desired.

Operation of Desorption Zone

In various aspects, one or more gas flows can be used in the desorption zone to facilitate desorption of at least a portion of the $CO_2$ that is sorbed on the portion of the sorbent bed that is within the desorption zone. The one or more gas flows can also be used for temperature management, including increasing the temperature of the sorbent bed to a desorption temperature. Optionally, an additional temperature control flow can be used to cool the sorbent bed prior to exiting from the desorption zone. Optionally, one or more additional gas flows can also be used so that at the boundaries between the sorption zone and the desorption zone (e.g., at the seal locations), the pressure within the desorption zone is greater than the pressure outside of the desorption zone.

Figure 5:
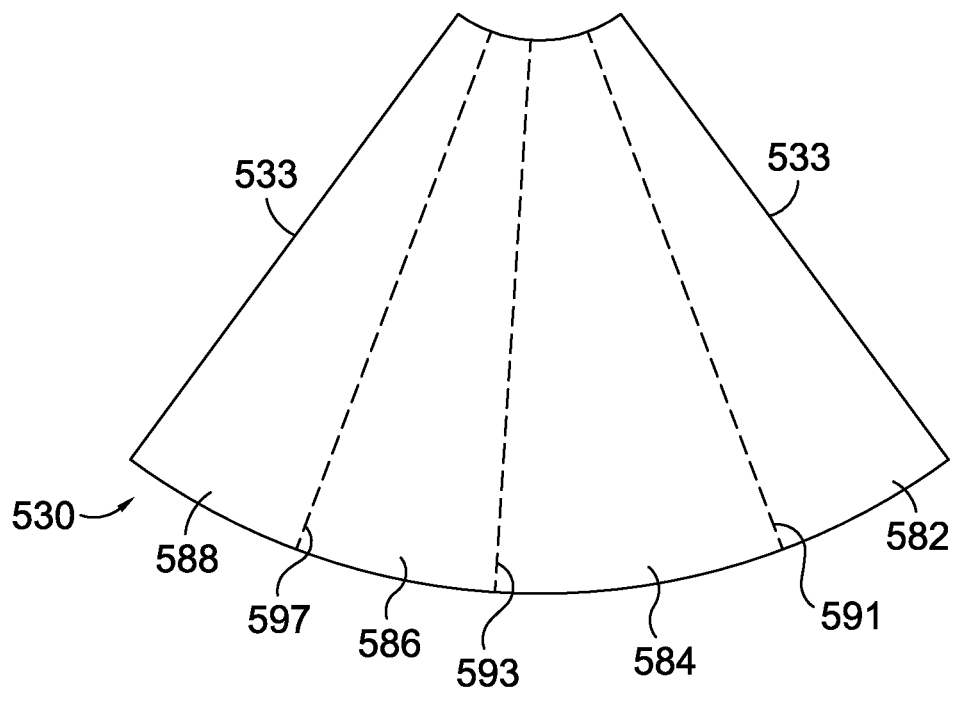
FIG. 5 shows an example of a configuration for a desorption zone.

FIG. 5 shows an example of the interior of a desorption zone. Sorbent bed portion 530 is located within the desorption zone. A seal 533 on either side of the sorbent bed portion 530 assists with minimizing passage of air into the desorption zone. The portion of the sorbent bed that corresponds to sorbent bed portion 530 changes as the rotary wheel rotates during the sorption/desorption process.

The example of a desorption zone shown in FIG. 5 includes four sub-zones. Sub-zone 582 corresponds to an initial purge sub-zone. Sub-zone 584 corresponds to the desorption sub-zone. Optional sub-zone 586 corresponds to a temperature adjustment sub-zone. Optional sub-zone 588 corresponds to another purge sub-zone.

In some aspects, the sub-zones can represent the general volume and/or portion of the sorbent bed where a corresponding gas flow is introduced within the desorption zone. Optionally, one or more additional internal seals can be used so that one or more of the sub-zones are separated by an additional internal seal. Due to the gas flows present in desorption zone 530, such internal seals can also correspond to purged seals. In some aspects, an internal seal can be present between each sub-zone in the desorption zone 530. As an example, in FIG. 5, additional seals 591, 593, and 595 are shown that divide the desorption zone 530 into sub-zones 582, 584, 586, and 588. These internal seals can assist with maintaining temperature differentials and/or pressure differentials between the sub-zones.

Optionally, similar seals can be used below sorbent bed portion 530 to create sub-zones below the sorbent bed (not shown). Creating separate sub-zones below the bed can be beneficial for forming a $CO_2$ product stream that contains a reduced or minimized amount of nitrogen and/or other gases used as purge or temperature adjustment flows. Due to the large difference in the condensation point of water versus $CO_2$, water can be removed relatively easily from a gas flow containing both water and $CO_2$. By reducing or minimizing the presence of other gases that condense less readily than water, subsequent processing of collected $CO_2$ to form a high purity $CO_2$ stream can be simplified.

In some aspects where seals are used, the rates for the gas flows can be selected independently, so that the relative pressures within sub-zones 582, 584, 586, and 588 can have any convenient relationship. In some aspects where seals are used, the gas flow rate in desorption sub-zone 584 can be lower than the gas flow rate in sub-zone 582 and/or in sub-zone 586, so as to reduce or minimize leakage of $CO_2$ from the high $CO_2$-concentration product formed by sub-zone 584 into the low $CO_2$-concentration products formed by sub-zone 582 and/or sub-zone 586.

The gas flow in sub-zone 582 corresponds to a purge flow. Nitrogen can be used as the purge flow, or any other convenient gas flow having an $O_2$ concentration of 650 vppm or less can be used (or 400 vppm or less, such as down to substantially no $O_2$ content). The purge flow in sub-zone 582 can perform two functions. First, as the sorbent bed rotates, sorbent bed portion 530 will typically contain some amount of air that is within the flow channels of the sorbent bed. The purge flow in sub-zone 582 allows this air carried into the desorption zone within the sorbent bed to be exhausted prior to heating the sorbent bed. Second, the purge flow in sub-zone 582 can be used to create a positive pressure differential relative to the pressure in the sorption zone on the other side of seal 533. The portion of the purge gas flow in sub-zone 582 that passes through the channels of the rotary wheel and exits from the opposite surface can be referred to as a purge flow exhaust.

The temperature of the gas flow in sub-zone 582 can be any convenient temperature between 0° C. and 50° C., or 10° C. to 40° C. One option can be to use a temperature that is similar to the ambient temperature, to minimize costs for providing the gas flow in sub-zone 582. The average or superficial gas velocity through the channels of the sorbent bed in sub-zone 582 can generally be greater than the gas velocity through the channels of the sorbent bed in the sorption zone. In some aspects, the gas velocity passing through the channels of the sorbent bed in sub-zone 582 can be between 0.04 m/s to 5.0 m/s, or 0.04 m/s to 2.2 m/s, or 0.1 m/s to 5.0 m/s, or 0.1 m/s to 2.2 m/s. By using a higher gas velocity in sub-zone 582 relative to the gas velocity of the $CO_2$-containing gas (e.g., air) in the adjacent portion of the sorption zone, a higher pressure can be maintained inside the desorption zone. In some aspects, the pressure within the desorption zone (or at least within sub-zone 582 of the desorption zone) can be higher than the pressure in the sorption zone by 0.15 kPa or more, or 0.5 kPa or more, or 1.0 kPa or more, such as up to 15 kPa or possibly still higher.

The gas flow in sub-zone 584 corresponds to steam that is used to facilitate desorption of $CO_2$ from the sorbent bed. This results in formation of a $CO_2$-containing gas flow that exits from the channels of the rotary wheel. Preferably the input gas flow in sub-zone 584 can be substantially composed of only steam (less than 3.0 vol % of other gases, or less than 1.0 vol %), but in some alternative aspects the steam flow can include other gases such as nitrogen. The steam provides heat to raise the temperature of the sorbent bed to a target temperature for desorption. In addition to heat directly transferred from the gas phase steam flow, additional heat can be transferred to the sorbent based on condensation of the steam on the surface(s) of the sorbent. This can allow the temperature of the sorbent bed in at least a portion of the desorption zone (such as a at least a portion of sub-zone 584) to be increased to a temperature of 70° C. to 200° C., or 80° C. to 200° C., or 100° C. to 200° C., or 70° C. to 170° C. The steam used to heat the sorbent bed can be at a sufficient temperature so that the steam is substantially entirely in the gas phase prior to entering the channels of the sorbent bed. At a pressure of roughly 100 kPa-a, this would correspond to having steam at a temperature of 100° C. or higher. More generally, the temperature of the steam can be 90° C. to 200° C., or 100° C. to 200° C., or 120° C. to 200° C. Preferably, the steam flow contains substantially no liquid water prior to entering the sorbent bed. This can correspond to having less than 0.1 wt % of the steam flow corresponding to liquid water droplets.

The steam also acts as a sweep gas for carrying the desorbed $CO_2$ into the collection manifold. The average or superficial gas velocity of the steam passing through the channels of the sorbent bed in sub-zone 584 can generally be similar to the gas velocity through the channels of the sorbent bed in sub-zone 582. In some aspects, the gas velocity of steam passing through the channels of the sorbent bed in sub-zone 584 can be between 0.04 m/s to 5.0 m/s, or 0.04 m/s to 2.2 m/s, or 0.1 m/s to 5.0 m/s, or 0.1 m/s to 2.2 m/s. In some aspects where sub-zone 582 and sub-zone 584 are separated by a seal, the average gas flow velocity of steam through the channels of the sorbent bed in sub-zone 584 can be lower than the average gas flow velocity through the channels of the sorbent bed in sub-zone 582.

The gas flow in sub-zone 586 corresponds to a temperature adjustment flow. Nitrogen and air are examples of suitable gases for the temperature adjustment flow. The portion of the temperature adjustment gas flow in sub-zone 586 that passes through the channels of the rotary wheel and exits from the opposite surface can be referred to as a temperature adjustment flow exhaust.

With regard to water content, evaporative cooling can occur for a temperature adjustment flow with any convenient water content, so long as the water content of the temperature adjustment flow is lower than the vapor pressure for water at the temperature of the temperature adjustment flow. During exposure of the sorbent bed to the temperature adjustment flow in sub-zone 586, the sorbent bed will have a higher temperature than the temperature adjustment flow. Thus, even if the temperature adjustment flow is initially saturated, heat transfer from the bed to the temperature adjustment flow will increase the temperature of the gas, thus allowing some evaporative cooling to occur.

In some aspects, the temperature adjustment flow can correspond to a "dry" temperature adjustment flow. Using a dry temperature adjustment flow can enhance the amount of evaporative cooling that occurs during exposure of the temperature adjustment flow to the sorbent bed. One way of specifying a "dry" gas flow is to specify a humidity for the gas flow at the temperature of the gas flow. In such aspects, the humidity of the gas flow (relative to the temperature of the gas flow) can be 50% or less, or 40% or less, or 30% or less, or 20% or less, such as down to having substantially no humidity. Additionally or alternately, the temperature adjustment flow can include 10 vol % or less of $H_2O$, or 5.0 vol % or less, or 1.0 vol % or less, such as down to having substantially no water content.

The temperature adjustment flow can have a temperature prior to entering the channels of the sorbent bed of 0° C. to 60° C., or 0° C. to 50° C., or 10° C. to 60° C., or 10° C. to 40° C. Based on the low humidity of the temperature adjustment flow, the temperature adjustment flow can provide two types of cooling for the sorbent bed. In addition to direct heat transfer from the gas phase flow, the sorbent bed can also be cooled by evaporation of water present in the liquid phase on the sorbent bed. As noted above, liquid water can be present on the sorbent bed due to condensation of steam during the steam desorption step in sub-zone 584.

The average or superficial gas velocity of the temperature adjustment flow through the channels of the sorbent bed in sub-zone 586 can generally be similar to the gas velocity through the channels of the sorbent bed in sub-zone 582. In some aspects, the gas velocity of the temperature adjustment flow passing through the channels of the sorbent bed in sub-zone 586 can be between 0.04 m/s to 5.0 m/s, or 0.04 m/s to 2.2 m/s, or 0.1 m/s to 5.0 m/s, or 0.1 m/s to 2.2 m/s. In some aspects where sub-zone 586 and sub-zone 584 are separated by a seal, the average gas flow velocity through the channels of the sorbent bed in sub-zone 584 can be lower than the average gas flow velocity through the channels of the sorbent bed in sub-zone 586.

In some aspects, the temperature adjustment flow can serve as a final purge gas for the desorption zone. In other aspects, a second optional purge gas flow can be provided in optional sub-zone 588. The use of a second purge gas flow can allow the temperature and velocity of the temperature adjustment flow to be selected independently of the conditions that are needed to provide a positive pressure inside the edge of the desorption zone relative to the sorption zone. If a separate second purge gas is provided in optional sub-zone 588, the gas velocity of the second purge gas flow passing through the channels of the sorbent bed in sub-zone 588 can be between 0.04 m/s to 5.0 m/s, or 0.04 m/s to 2.2 m/s, or 0.1 m/s to 5.0 m/s, or 0.1 m/s to 2.2 m/s. The temperature of the second purge gas can be 0° C. to 60° C., or 0° C. to 50° C., or 10° C. to 60° C., or 10° C. to 40° C.

The temperature adjustment flow and any optional second purge gas flow can be used to reduce the temperature of the sorbent bed prior to exiting from the desorption zone. This can allow the temperature of the sorbent bed in at least a portion of the desorption zone (such as a at least a portion of sub-zone 586 and/or 588) to be decreased to a temperature of 10° C. to 70° C., or 10° C. to 50° C., or 30° C. to 70° C.

It is noted that the combination of the steam flow in sub-zone 584, the temperature adjustment flow in sub-zone 586, and the optional second purge flow in sub-zone 588 will result in a temperature profile within the desorption zone, with the portion of the sorbent bed in sub-zone 584 having a higher temperature than portions of the sorbent bed in sub-zone 582, sub-zone 586, or optional sub-zone 588.

Sorbent Materials

The sorbent bed of the rotary wheel can correspond to a monolith (or an assembly of smaller pieces) that is used to support a sorbent, such as an amine-based sorbent. Generally, the sorbent can be a sorbent that provides sorption of $CO_2$ at temperature and pressure conditions near ambient conditions (e.g., roughly 0° C. to 40° C. and a pressure of roughly 90 kPa-a to 110 kPa-a). Such a sorbent is defined herein as a sorbent that has selectivity for sorption of $CO_2$.

The sorbent can be supported on the monolith in any convenient manner. One option can be to impregnate a monolith material/other support structure with an amine sorbent compound and/or polymer. This can allow the amine sorbent to be incorporated onto the surface and/or into the pores of a porous support structure. Another option can be to chemically bond a sorbent to the surface of the support structure. Still another option can be to form a polymer layer with $CO_2$ sorption capacity (such as a polymer layer with amine functionality) in-situ on the interior surfaces of the channels in the support structure. Yet another option can be to incorporate a sorbent into a support layer that is applied to the support structure, such as by incorporating a sorbent into an alumina layer that is deposited on the surfaces of a support structure.

A variety of amines can potentially be used as sorbent materials for $CO_2$ capture. Some amines can correspond to polymers with amine functionality, such as polyethyleneimine and/or polypropyleneimine. Polyethyleneimine, polypropyleneimine, or combinations thereof are examples of amine systems that can be deposited on and/or impregnated into a monolith surface. Another example of an amine is 3-aminopropyltrimetlioxysilane. For a monolith with suitable amounts of oxygen funetionalities available at the monolith surface, this type of amine can be grafted onto the monolith surface.

Other examples of sorbent materials include, but are not limited to, metal organic framework materials (MOFs) and materials having a zeotype framework structure. It is noted that the sorption capacity of some MOF and zeotype sorbents can be modified and/or enhanced by appending amine sorbents to the MOF or zeotype.

Additional Configurations—Variations of Sorbent Bed

FIGS. 2-4 generally show an example of a sorbent bed configuration. FIG. 1 shows an example of incorporating a sorbent bed, such as the sorbent bed in FIGS. 2-4, into a sorption apparatus where a single sorbent bed is used in a horizontal orientation. In other aspects, other configurations for a sorption apparatus can be used.

One type of alternative configuration is to use a sorbent bed that is mounted in an orientation other than being substantially horizontal relative to the direction of gravitational pull. For example, in some aspects the sorbent bed can be mounted in a vertically-oriented wheel framework structure, so that the direction of gravitational pull is roughly perpendicular to the axis of rotation for the sorbent bed. In still other aspects, any convenient orientation for the sorbent bed/wheel framework structure can be used. Because the majority of the flows in the sorbent bed are gas phase flows, with sufficient initial velocities, the operation of the sorption zone and the desorption zone with a vertically mounted sorbent bed can be substantially similar to operation with a horizontally mounted sorbent bed. It is noted that any liquid water formed by steam condensation may require different handling. One option for handling the liquid water can be to locate the desorption zone at the bottom of the sorbent bed relative to the direction of gravitational pull. This can simplify placing a collection trough within the desorption zone at a suitable location for collecting any liquid water exiting from the sorbent bed.

Figure 6:
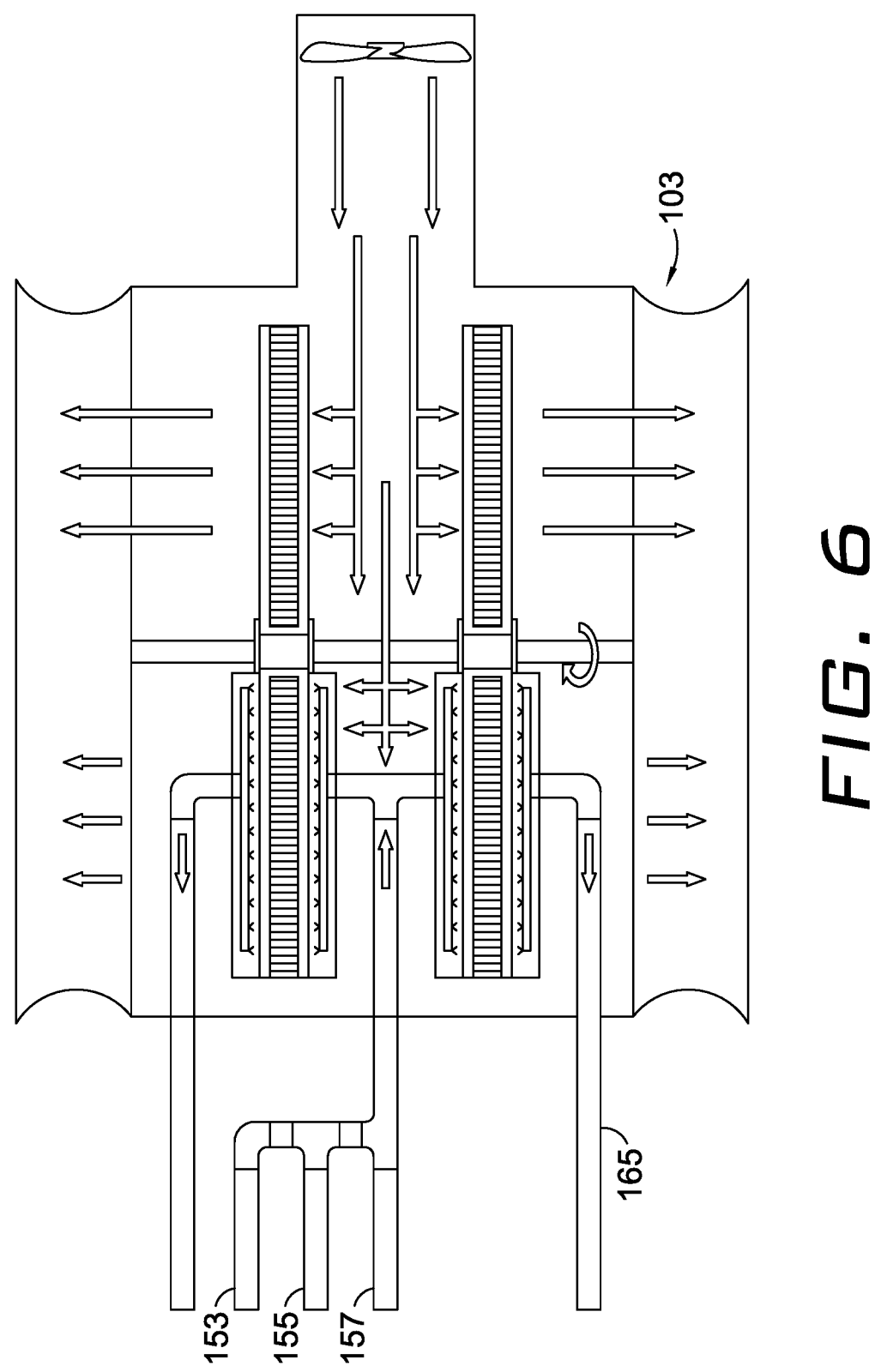
FIG. 6 shows an alternative configuration that includes two sorbent beds supported on rotary wheel framework structures.

FIG. 6 shows another type of alternative configuration where two sorbent beds are used. In the example configuration shown in FIG. 6, rotor housing 601 includes rotor assembly 610 (containing support material 615 for supporting a sorbent) and rotor assembly 620 (containing support material 625 for supporting a sorbent). In the example shown in FIG. 6, instead of being above or below the beds, fan or blower 608 is positioned to the side of the rotor assembly 610 and rotor assembly 620. In other aspects, fan or blower 608 can be in any convenient location, and duct work can be used to provide fluid communication between fan or blower 608 and the sorbent beds. Fan or blower 608 forces air into the volume between the sorbent beds 615. Partition walls 604 are interior walls in rotor housing 601 that reduce, minimize, or eliminate the gap between rotor assemblies 610 and 620 and the nearest wall. As a result, air flow is forced to pass through the channels in support material 615 and support material 625, with a reduced or minimized ability to bypass the sorbent beds. The gas flows 653 (nitrogen purge), 655 (steam), and 657 (temperature adjustment flow) for the desorption zones can also be introduced between the beds, so that a single flow source for each gas flow can provide gas flows for both sorbent beds. The product outflows 665 from the sorbent on support material 615 can be recovered separately from product outflows 667 from the sorbent on support material 625. Manifolds for managing the input and output flows to the sorbent beds can be used, such as manifolds similar to those shown in FIG. 1. It is noted that a water collection trough can be included in the lower regeneration cover for the upper sorbent bed, even though the lower regeneration cover corresponds to the input flow side for the upper sorbent bed.

Additional Configurations—Discrete Movement of Rotary Sorbent Bed

In some aspects, instead of continuously rotating the rotary sorbent bed, the sorbent bed can move in discrete amounts, with pauses in between the movement. By moving the sorbent bed in discrete amounts and then stopping, additional processing options are available. In particular, moving the sorbent bed in discrete amounts can allow for use of seals that form a fully sealed contact with the surface of the support material for the sorbent. Inflatable seals are an example of this type of seal. By using an inflatable seal, or another type of seal that provides a fully sealed contact with the support material, greater pressure differentials can be achieved between the desorption zone and the sorption zone. This can allow pressures below 100 kPa-a to be used in the desorption zone to assist with desorption of $CO_2$.

During discrete movement of the sorbent bed (and corresponding wheel framework structure), during each movement step, the sorbent bed can be rotated by any convenient amount. In some aspects, the size of each movement step can match the amount of the sorbent bed that is located in the desorption zone. In other words, during a movement step, the portion of the sorbent bed in the desorption zone is moved entirely into the sorbent zone. In other aspects, discrete movement steps can be used to partially move the portion of the sorbent bed from the desorption zone into the sorption zone. In such aspects, a plurality of discrete movement steps are required to move the portion of the bed in the desorption zone into the sorption zone. Of course, moving the portion of the bed in the desorption zone into the sorption zone also results in moving another portion of the sorbent bed from the sorption zone into the desorption zone.

During operation, the steps of the sorption/desorption process are similar, and the operation in the sorption zone can be substantially the same as operation of the sorption zone when using continuous movement of the sorbent bed. However, there are various options for how to operate the desorption zone in conjunction with discrete movement of the sorbent bed.

One option for operation of the desorption zone during discrete movement of the sorbent bed is to use a strategy similar to the strategy during continuous movement of the sorbent bed. In this type of option, the desorption zone can still include a plurality of sub-zones for different gas flows, and seals can even be present within desorption zone to further define the sub-zones. In this type of aspect, the size of the sub-zones can be substantially uniform, and the size of the movement step for the wheel can match the size of a sub-zone. Optionally, one or more sub-zones could have a size that is a multiple of the size of a movement step, as opposed to having each sub-zone have the substantially the same size as a movement step. In this type of aspect, the process sequence could start with movement of the wheel by a movement step into a new position. The seals could then be engaged with the surface of the sorbent bed (such as the surface of the support material. Next, the gas flows for the desorption zone can be turned on for a period of time. The gas flows can then be stopped, the seals disengaged, and the next movement of the wheel can occur.

Alternatively, when using discrete movement of the sorbent bed, the gas flows in the desorption zone can be used sequentially, as opposed to having concurrent gas flows. In this type of aspect, the sorbent bed can be moved by a movement step. In some aspects, the movement step will correspond to the size of the desorption zone, so that the entire portion of the sorbent bed in the desorption zone is moved to a position in the sorption zone. This also results in a new portion of the sorbent be being in the desorption zone. However, other types of movement steps can also be used. After the movement step, the seals are engaged with the surface of the sorbent bed. The gas flows for the desorption step can then be sequentially applied to all of the sorbent bed that is in the desorption zone. In various aspects, this can mean exposing the portion of the sorbent bed in the desorption zone to an initial purge gas flow; a desorption gas flow; an optional second purge flow; and an optional temperature adjustment gas flow. These gas flows can be similar to the gas flows described herein. The difference is in exposing all of the sorbent bed to the gas flows sequentially, as opposed to having different sub-zones of the sorbent bed exposed to each of the gas flows concurrently.

In aspects where the sorbent bed is moved in discreet amounts and where seals engaged with the surface are used, larger differences in pressure can be maintained between the desorption zone volume and the sorption zone. Optionally in such aspects, a pressure in the desorption zone volume during at least a portion of the desorption step can be lower than a pressure in the sorption zone (i.e., outside of the desorption zone volume) by 10 kPa or more, or 20 kPa or more, or 40 kPa or more, such as being lower than a pressure in the sorption zone by up to 99 kPa or possibly still more.

ADDITIONAL EMBODIMENTS

Embodiment 1. A system for sorption of $CO_2$, comprising: a sorbent bed housing; a wheel framework structure within the sorbent bed housing; a sorbent bed comprising: a support material comprising one or more monoliths, the one or more monoliths supported by the wheel framework structure, the support material comprising a first surface, a second surface, and a plurality of channels providing a flow path between the first surface of the support material and the second surface of the support material, and a sorbent with selectivity for sorption of CO 2 supported on the support material, at least a portion of the sorbent being supported on one or more surfaces within the plurality of channels; at least one fan or blower associated with the sorbent bed housing, the at least one fan or blower being in fluid communication with a first portion of the plurality of channels; at least one cover plate; one or more cover plate seals attached to the one or more cover plates, a second portion of the plurality of channels being within a desorption zone volume defined by the at least one cover plate and the one or more cover plate seals, the one or more cover plate seals providing a) a seal between the at least one cover plate and the first surface of the support material, b) a seal between the at least one cover plate and the second surface of the support material, or c) a combination of a) and b); one or more input flow conduits providing fluid communication between at least a source of a one or more gases and the desorption zone volume; and at least one output flow conduit in fluid communication with the desorption zone volume.

Embodiment 2. The system of Embodiment 1, further comprising at least one internal seal within the desorption zone volume, the at least one internal seal providing a seal between an interior surface of the one or more cover plates and at least one of the first surface and the second surface of the support material, the at least one internal seal defining a plurality of sub-zones within the desorption zone volume.

Embodiment 3. The system of Embodiment 2, wherein at least a first input flow conduit of the one or more input flow conduits is in fluid communication with a first sub-zone of the plurality of sub-zones within the desorption zone volume, and wherein at least a second input flow conduit of the one or more input flow conduits is in fluid communication with a second sub-zone of the plurality of separate sub-zones within the desorption zone volume.

Embodiment 4. The system of Embodiment 2 or 3, wherein at least one sub-zone of the desorption zone volume is separated from the first portion of the plurality of channels by at least one internal seal and at least one cover plate seal.

Embodiment 5. The system of any of the above embodiments, wherein the one or more cover plate seals comprise one or more purged seals, or wherein the one or more cover plate seals comprise one or more inflatable seals.

Embodiment 6. The system of any of the above embodiments, wherein the one or more input flow conduits are in fluid communication with the desorption zone volume via at least one input manifold; or wherein the at least one output flow conduit is in fluid communication with the desorption zone volume via at least one output manifold; or a combination thereof, the at least one output manifold optionally comprising a liquid collection trough.

Embodiment 7. The system of any of the above embodiments, wherein the wheel framework structure is supported by a central support, the central support optionally being configured for rotation of the wheel framework structure by a motor.

Embodiment 8. The system of any of the above embodiments, wherein the wheel framework structure is mechanically engaged by one or more gears configured for rotation of the wheel framework structure.

Embodiment 9. The system of any of the above embodiments, wherein the first portion of the plurality of channels are in direct fluid communication with the at least one fan or blower.

Embodiment 10. A method of sorbing $CO_2$ using a system according to any of Embodiments 1 to 9, comprising:

rotating the wheel framework structure; exposing a first gas flow comprising 15 vol % to 25 vol % $O_2$ and 100 vppm to 650 vppm $CO_2$ to a first portion of the sorbent bed outside of the desorption zone volume, the first gas flow having a temperature of 0° C. to 40° C.; exposing a plurality of gas flows to a second portion of the sorbent bed within the desorption zone volume, the exposing a plurality of gas flows to the second portion of the sorbent bed comprising sequentially exposing the second portion of the sorbent bed to: a purge gas flow to form a purge exhaust, and a steam flow having a temperature of 80° C. to 180° C. to form a $CO_2$-containing output flow, wherein the rotating of the wheel framework structure changes the portions of the sorbent bed that correspond to the first portion of the sorbent bed outside of the desorption zone volume and the second portion of the sorbent bed within the desorption zone volume.

Embodiment 11. The method of Embodiment 10, wherein the desorption zone volume comprises a plurality of sub-zones, each sub-zone comprising at least one of the plurality of gas flows.

Embodiment 12. The method of Embodiment 10 or 11, wherein a temperature of a leading edge of the second portion of the sorbent bed is 70° C. or higher after the exposing to the steam flow, and a temperature of a trailing edge of the second portion of the sorbent bed is 60° C. or lower prior to being rotated out of the desorption zone volume.

Embodiment 13. The method of any of Embodiments 10 to 12, wherein exposing the plurality of gas flows to the second portion of the sorbent bed further comprises exposing the second portion of the sorbent bed to a temperature adjustment flow after the steam flow, the temperature adjustment flow having a temperature 0° C. to 50° C. to form a temperature adjustment flow exhaust, the exposing the plurality of gas flows to the second portion of the sorbent bed optionally further comprising exposing the second portion of the sorbent bed to a second purge gas flow after the temperature adjustment flow, the temperature adjustment flow optionally comprising a humidity of 25% or less relative to the temperature of the temperature adjustment flow.

Embodiment 14. The method of any of Embodiments 10 to 13, wherein exposing the second portion of the sorbent bed to the steam flow further forms a liquid output product, or wherein the steam flow comprises substantially no liquid water content, or a combination thereof.

Embodiment 15. The method of any of Embodiments 10 to 14, wherein a pressure inside the desorption zone volume is greater than a pressure outside the desorption volume by 2.0 kPa or more, or wherein a pressure inside the desorption zone volume is lower than a pressure outside the desorption zone volume by 20 kPa or more, or a combination thereof.

Additional Embodiment A. The method of any of Embodiments 10 to 15, wherein exposing the second portion of the sorbent bed to the plurality of gas flows comprises exposing the second portion of the sorbent bed to the plurality of gas flows sequentially in time.

Additional Embodiment B. The method of any of Embodiments 10 to 15, wherein the first gas flow comprises air.

Additional Embodiment C. The method of any of Embodiments 10 to 15, wherein the first gas flow impinges on at least one surface of the at least one cover plate of the desorption zone, the average direction of flow for the first gas flow in the sorption zone being substantially orthogonal to the at least one surface of the at least one cover plate of the desorption zone.

Additional Embodiment D. The method of any of Embodiments 10 to 15, wherein rotating the wheel framework structure comprises continuously rotating the wheel framework structure.

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The foregoing description of the disclosure illustrates and describes the present methodologies. Additionally, the disclosure shows and describes exemplary methods, but it is to be understood that various other combinations, modifications, and environments may be employed and the present methods are capable of changes or modifications within the scope of the concept as expressed herein, commensurate with the above teachings and/or the skill or knowledge of the relevant art.

We claim:

1. A method of sorbing $CO_2$, comprising:
  rotating a wheel framework structure that supports a sorbent bed, the sorbent bed comprising a support material comprising one or more monoliths and a sorbent having selectivity for sorption of $CO_2$ supported on the support material,
  the support material comprising a first surface, a second surface, and a plurality of channels providing a flow path between a first surface of the support material and a second surface of the support material, at least a portion of the sorbent being supported on one or more surfaces within the plurality of channels;
  exposing a first gas flow comprising 15 vol % to 25 vol % $O_2$ and 100 vppm to 650 vppm $CO_2$ to a first portion of the sorbent bed outside of the desorption zone volume, the first gas flow having a temperature of 0° C. to 40° C.;
  exposing a plurality of gas flows to a second portion of the sorbent bed within the desorption zone volume, the desorption zone volume defined by at least one cover plate and one or more cover plate seals, the one or more cover plate seals providing a) a seal between the at least one cover plate and the first surface of the support material, b) a seal between the at least one cover plate and the second surface of the support material, or c) a combination thereof, the exposing a plurality of gas flows to the second portion of the sorbent bed comprising sequentially exposing the second portion of the sorbent bed to:
  a purge gas flow to form a purge exhaust, and
  a steam flow having a temperature of 80° C. to 180° C. to form a $CO_2$-containing output flow,
  wherein the rotating of the wheel framework structure changes the portions of the sorbent bed that correspond to the first portion of the sorbent bed outside of the desorption zone volume and the second portion of the sorbent bed within the desorption zone volume.

2. The method of claim 1, wherein the desorption zone volume comprises a plurality of sub-zones, each sub-zone comprising at least one of the plurality of gas flows.

3. The method of claim 1, wherein exposing the second portion of the sorbent bed to the plurality of gas flows comprises exposing the second portion of the sorbent bed to the plurality of gas flows sequentially in time.

4. The method of claim 1, wherein exposing the plurality of gas flows to the second portion of the sorbent bed further comprises exposing the second portion of the sorbent bed to a temperature adjustment flow after the steam flow, the temperature adjustment flow having a temperature 0° C. to 50° C. to form a temperature adjustment flow exhaust.

5. The method of claim 4, wherein a temperature of a leading edge of the second portion of the sorbent bed is 70° C. or higher after the exposing to the steam flow, and a temperature of a trailing edge of the second portion of the sorbent bed is 60° C. or lower prior to being rotated out of the desorption zone volume.

6. The method of claim 4, wherein exposing the plurality of gas flows to the second portion of the sorbent bed further comprises exposing the second portion of the sorbent bed to a second purge gas flow after the temperature adjustment flow.

7. The method of claim 4, wherein the temperature adjustment flow comprises a humidity of 25% or less relative to the temperature of the temperature adjustment flow.

8. The method of claim 1, wherein exposing the second portion of the sorbent bed to the steam flow further forms a liquid output product, or wherein the steam flow comprises substantially no liquid water content, or a combination thereof.

9. The method of claim 1, wherein the desorption zone volume comprises at least one internal seal, the at least one internal seal providing a seal between an interior surface of the one or more cover plates and at least one of the first surface and the second surface of the support material, the at least one internal seal defining a plurality of sub-zones within the desorption zone volume.

10. The method of claim 1, wherein a pressure inside the desorption zone volume is greater than a pressure outside the desorption volume by 2.0 kPa or more.

11. The method of claim 1, wherein a pressure inside the desorption zone volume is lower than a pressure outside the desorption zone volume by 20 kPa or more.

12. The method of claim 1, wherein at least one sub-zone of the desorption zone volume is separated from the first portion of the plurality of channels by at least one internal seal and at least one cover plate seal.

13. The method of claim 1, wherein the first gas flow impinges on at least one surface of the at least one cover plate of the desorption zone, the average direction of flow for the first gas flow in the sorption zone being substantially orthogonal to the at least one surface of the at least one cover plate of the desorption zone.

14. The method of claim 1, wherein rotating the wheel framework structure comprises continuously rotating the wheel framework structure.

* * * * *